United States Patent [19]

Yamazaki

[11] Patent Number: 5,113,491
[45] Date of Patent: May 12, 1992

[54] PATTERN DRAWING SYSTEM HAVING A PROCESSOR FOR DRAWING THE PROFILE OF THE PATTERN AND A PROCESSOR FOR PAINTING THE DRAWN PROFILE

[75] Inventor: Takanaga Yamazaki, Tokyo, Japan
[73] Assignee: Hitachi, Ltd., Tokyo, Japan
[21] Appl. No.: 384,322
[22] Filed: Jul. 24, 1989

[30] Foreign Application Priority Data

Jul. 27, 1988 [JP] Japan .................. 63-187888

[51] Int. Cl.$^5$ ............................. G06F 15/62
[52] U.S. Cl. ..................... 395/141; 395/133; 395/150
[58] Field of Search .............. 364/518-521, 364/523; 382/9; 340/721, 723

[56] References Cited

U.S. PATENT DOCUMENTS

| Re. 30,679 | 7/1981 | Evans et al. | 364/523 |
| 4,907,282 | 3/1990 | Daly et al. | 364/518 X |
| 4,937,761 | 6/1990 | Hassett | 364/518 |

OTHER PUBLICATIONS

"Multiuser Operational Optical Printer Controller Featuring 20 Pages Per Minute", Nikkei Electronics, published by Nikkei McGraw-Hill, Mar. 23, 1987, pp. 205-227.

*Primary Examiner*—Heather R. Herndon
*Attorney, Agent, or Firm*—Fay, Sharpe, Beall, Fagan, Minnich & McKee

[57] ABSTRACT

The pattern drawing system consists of a first data processor which develops the outline font data, calculates the coordinates of the points on the profile of a pattern and, according to the calculated profile coordinates, draws the profile of the pattern; and a second data processor which paints the interior of the profile drawn by the first data processor concurrently with the calculation of the profile coordinates by the first data processor. This configuration allows the first data processor to calculate the profile coordinates of a desired pattern while the second data processor is doing the painting. Such parallel operations improve the efficiency of the pattern drawing that uses the outline font data.

4 Claims, 6 Drawing Sheets

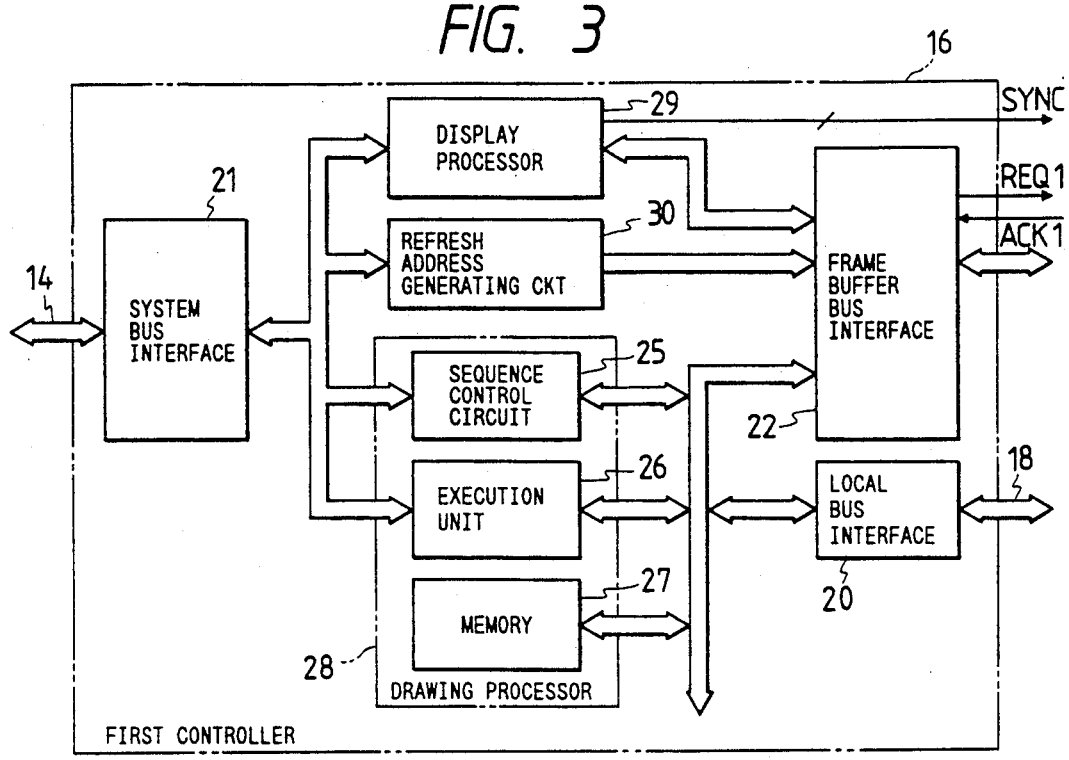
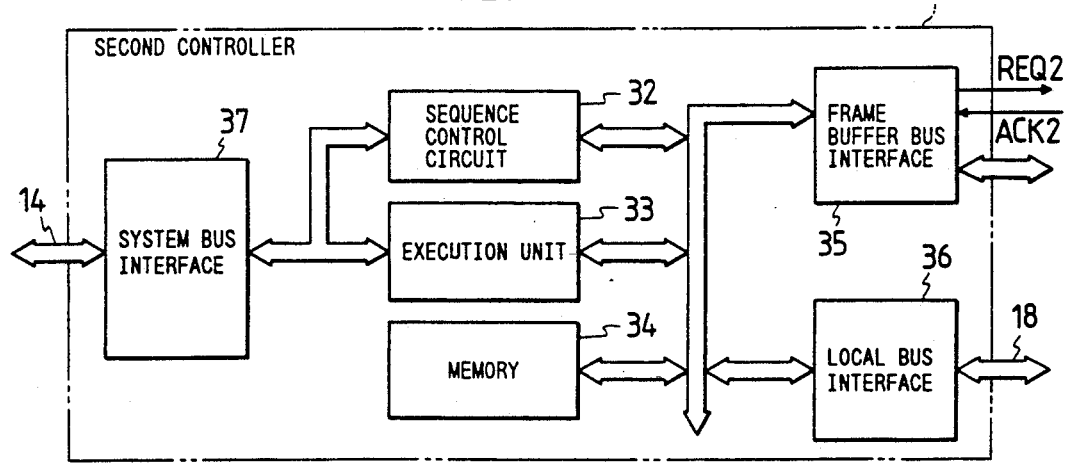

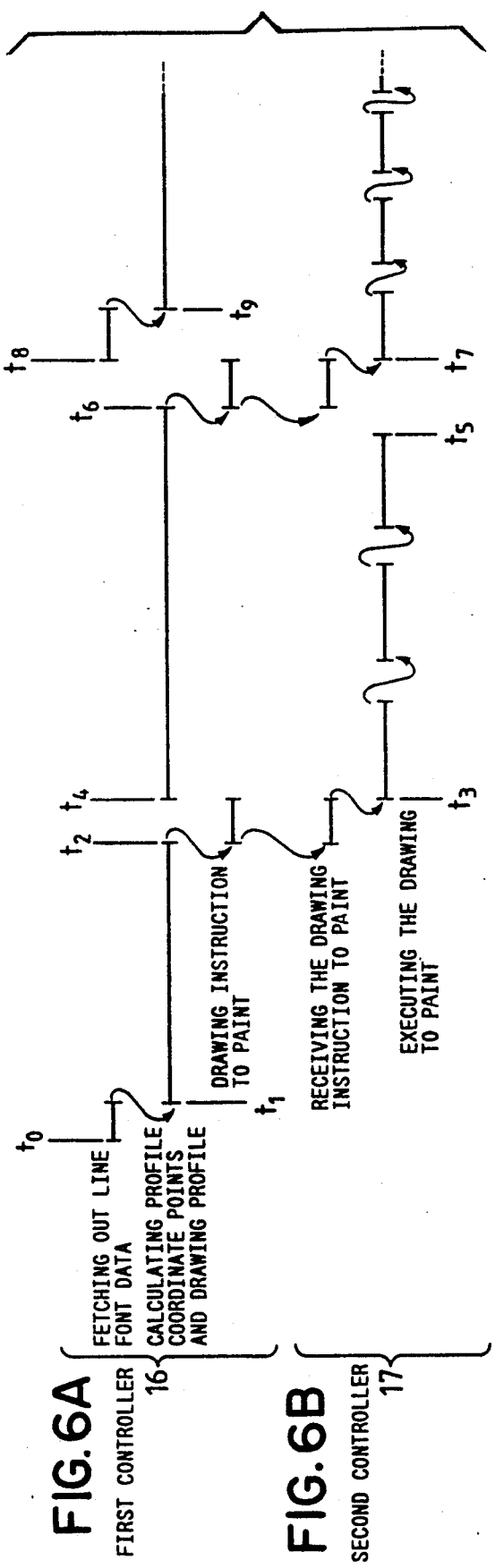

PATTERN DRAWING SYSTEM HAVING A PROCESSOR FOR DRAWING THE PROFILE OF THE PATTERN AND A PROCESSOR FOR PAINTING THE DRAWN PROFILE

BACKGROUND OF THE INVENTION

This invention relates to a pattern drawing technique using outline font data and further to a technique to improve the pattern drawing system efficiency. The invention may suitably be applied to drawing image information supplied to page printers such as laser beam printers or bit map displays such as cathode-ray tubes.

The font data used in drawing patterns on the bit map memory is expressed in a dot font system which expresses the patterns in dot matrices. The dot font system has the advantage of being able to handle data easily since the font data themselves are expressed in dot matrices that have one-to-one correspondence with pixels. The dot font system can also draw patterns based on the font data at high speed. It has, however, drawbacks. It is difficult to rotate the pattern to a desired angle. When the dot density is low, the outline of the pattern becomes rough when magnified. On the other hand, increasing the dot density results in a significant increase in the amount of data processed.

To eliminate this problem, a so-called vector graphics technique may be used which has a data structure that defines the outline of a pattern as the collection of line sections. This eliminates the problems of rough pattern outline and of an increase in the amount of font data.

The above outline font data includes, for example, information about the kind of line such as free curves—short line vector, arc, spline curve and Bezier curve——and information about the starting and ending point of the line, and also about control points. This information defines the outline of the font.

In conventional systems using such outline font data in drawing required patterns, a processor that controls the whole system reads the corresponding outline font data from main memory, perform necessary processing on the outline defined by the outline font data thus read, such as rotation, magnification and reduction, and calculates the logical coordinates of the outline using the dot matrices. The information thus calculated is given to an advanced cathode ray tube controller (ACRTC). Based on a command from the processor and the logical coordinate data, the controller generates the outline draw address of the pattern and draws the outline. Next, the processor sends to the controller a command for painting the inside of the outline as well as a paint starting point. In response to this information, the controller performs the read/modify/write on the frame buffer memory and repeats this memory operation to paint the inside of the pattern outline.

According to the display control by the controller, the image information drawn on the frame buffer memory is supplied to CRT display equipment as video signals from the serial port of the frame buffer memory which has dual ports.

Examples of literatures that describe the pattern drawing technique using the outline font data include a "Nikkei Electronics," page 205-227, published by Nikkei McGraw-Hill on Mar. 23, 1987.

The inventor of this invention has found that the above conventional systems have the problem of a low efficiency of pattern drawing using outline font data.

That is, the controller such as ACRTC performs a serial processing, which consists of first drawing the pattern outline according to the instructions from the processor and then painting the interior of the outline according to the commands from the processor. Because of this serial approach, the controller cannot perform the next outline draw processing, such as calculating the outline draw addresses, while painting. The processor has to wait until the painting process is finished. Furthermore, for the controller such as ACRTC to be able to perform the outline drawing based on the outline font data, the processor must first calculate the coordinates by converting the outline font data into a data type handled by the controller. Since the algorithm to calculate the coordinates of a free curve section defined by the outline font data is relatively complex, the burden on the processor, which is used for general purposes, increases, thus lowering the operation efficiency of the entire system.

SUMMARY OF THE INVENTION

The outline of one representative embodiment of the invention is briefly explained below.

The pattern drawing system of this invention consists of two parallelly installed data processing means that can operate concurrently. That is, the first data processing means calculates the pattern outline coordinates corresponding to desired outline font data to allow the pattern outline to be drawn on the bit map memory. The first data processing means then draws the pattern outline calculated on the bit map memory. The second data processing means paints the inside area of the pattern outline that was drawn by the first data processing means.

With this configuration, while the second data processing means is performing the paint operation, the first data processing means can calculate the next pattern outline coordinates. Such a parallel processing improves the efficiency of pattern drawing that utilizes the outline font data.

The first data processing means is also given a function to directly read the outline font data and calculate the corresponding pattern outline coordinates. This eliminates the need for the processor, which controls the entire system, to perform arithmetic operations—such as rotation, enlargement and reduction—on the outline defined by the outline font data, to calculate the logical coordinates for that outline in dot matrix form. This alleviates the burden on the processor during the outline font drawing, which in turn improves the operation efficiency of the system as a whole. Furthermore, the first data processing means is given a function to supply, after the outline drawing, to the second data processing means the paint operation control information and a command initiating that operation. This also reduces the burden on the processor in charge of controlling the entire system.

When we consider a case where the first and second data processing means have different processing speeds, it is preferred that a queuing buffer means be provided which contains a first-in, first-out waiting queue of paint control information along with the associated commands that were issued from the first data processing means to the second data processing means. Because of the buffer means, when the second data processing means is performing the paint operation on a large internal area of an outline, the first data processing means does not have to be stopped and wait until the second data processing means finishes the operation. Therefore, the first data processing means can proceed to its own operations such as calculating the coordinates and drawing the outline, thereby further improving the efficiency of the pattern drawing operation which utilizes the outline font data.

It may also be possible to have the second data processing means receive the pattern outline coordinates from the first data processing means and, according to that outline coordinates, perform the outline drawing and the paint operation on the interior of the outline.

The object of this invention is to provide a pattern drawing system which improves the efficiency of the pattern drawing using outline font data.

Another object of the invention is to provide a pattern drawing system which reduces the burden on a data processing device, such as a processor that is used for general system operations and for controlling the entire system, to improve the operation efficiency of the system as a whole.

These and other objects and novel features will become apparent from the following descriptions taken in conjunction with the attached drawings.

BRIEF DESCRIPTION OF THE DRAWINGS

FIG. 3 is a block diagram showing one example of the first controller;

FIG. 4 is a block diagram showing one example of the second controller;

FIGS. 6A and 6B are timing chart showing the timing of the pattern drawing operation of FIG. 5A to 5F using the outline font data;

DESCRIPTION OF THE PREFERRED EMBODIMENTS

Figure 1:
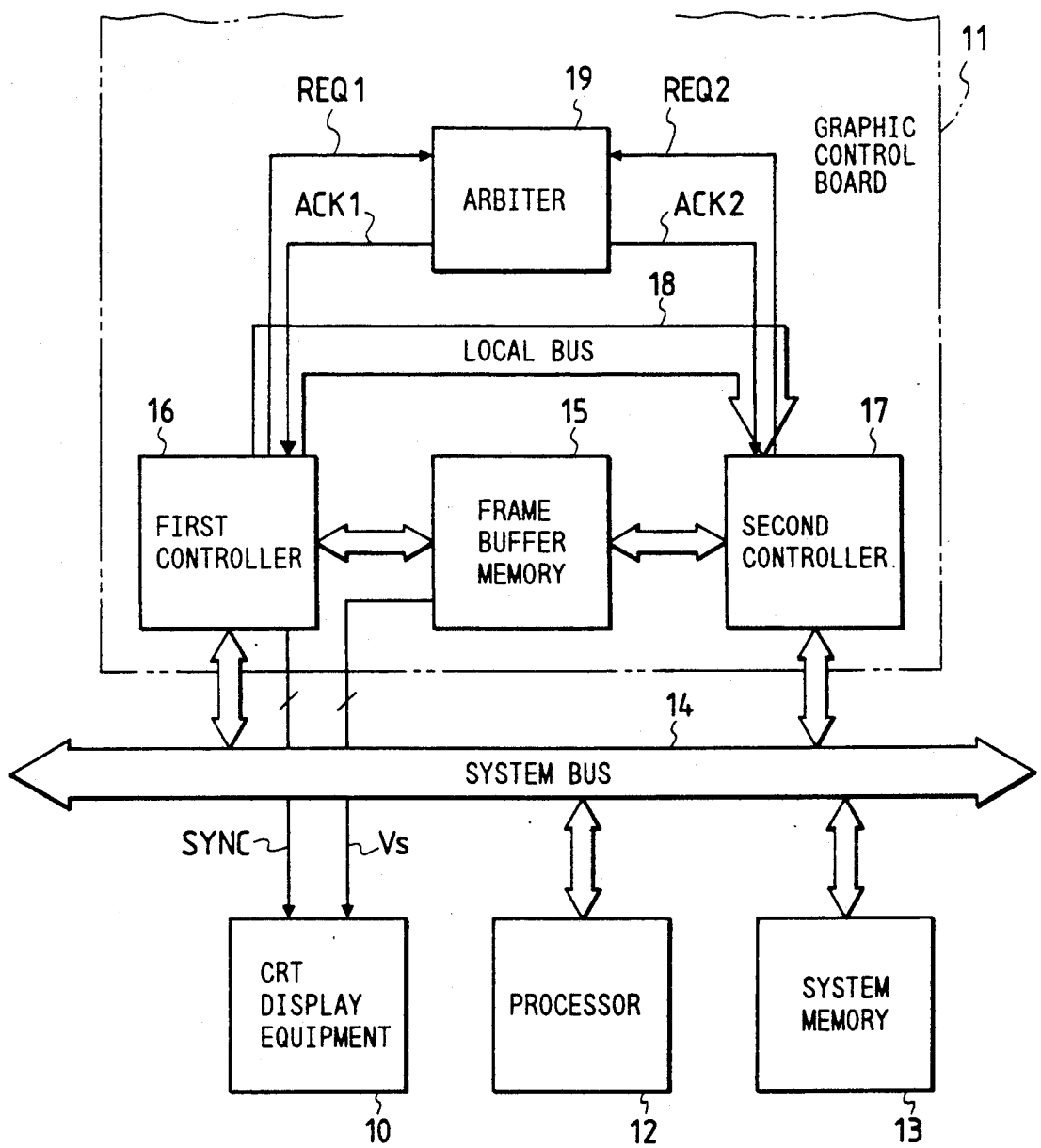
FIG. 1 is a block diagram of one embodiment of this invention.

FIG. 1 shows the essential circuitry of a graphics system as one embodiment of this invention.

The graphics system shown in FIG. 1 may be a system that supports the pattern drawing control and the display control for displaying drawn images on a CRT display equipment 10. The drawing control and the display control are performed by the graphic control board 11. The graphic control board 11 shares a system bus 14 with a processor 12 which controls the system as a whole, and with a system memory 13.

The graphic control board 11 has a function of drawing a pattern by using the outline font data which has a data structure that defines the pattern outline or profile as a collection of line sections. (Drawing a pattern by using the outline font data will also be referred to simply as an outline font draw.)

Figure 2:
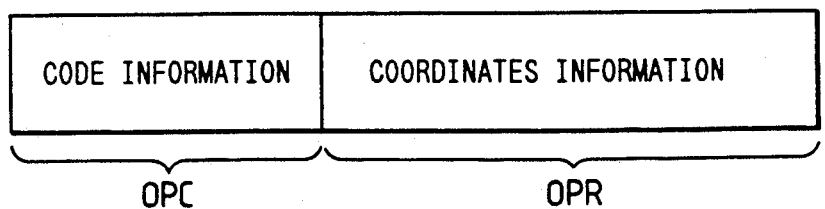
FIG. 2 is a diagram for explaining the outline font data.

The outline font data, as shown in FIG. 2, has a unit format which consists of an operation code specifying field OPC and an operand specifying field OPR. The operation code specifying field OPC contains code information representing the kind of line, such as free curves—short line vector, arc, spline curve, and Bezier curve—and straight lines. The operand specifying field OPR contains coordinates information representing the starting and ending points of the line defined by the code information and also control points required in defining the free curves.

For instance, the outline of a character or symbol, which consists of a plurality of curves and straight lines, is defined by a set of outline font data each of which defines a line section contained in that outline. These various outline font data are stored in the system memory 13, classified for each character and symbol.

The graphic control board 11 may contain a frame buffer memory 15 which functions as a bit map memory and which has a random access port dedicated for line drawing and a serial access port used for serial output of video signal Vs. In this embodiment, the frame buffer memory 15 is provided with one random access port, which is shared with a first controller 16 and a second controller 17. The right to access the frame buffer memory 15 by the first controller 16 and the second controller 17 may be controlled by an arbiter 19. The arbiter 19 accepts request signals REQ1, REQ2 from the first controller 16 and the second controller 17 and in response sends acknowledge signals ACK1, ACK2 to the first and second controllers, respectively. The first controller 16 is given a higher priority than the second controller 17 in accessing the frame buffer memory 15. Depending on whether there are access demands represented by the request signals REQ1, REQ2, and according to the access priority level, the arbiter 19 gives either one of the controllers 16, 17 the right to access the frame buffer memory 15.

The first controller 16 performs the pattern drawing control by generating draw data and draw addresses to store desired image information on the frame buffer memory 15. At the same time, the first controller 16 also performs other controls such as display address control and timing control. The display address control serially outputs the image information on the frame buffer memory 15 as video signals Vs to the CRT display equipment 10; and the timing control synchronizes image information output to the CRT display equipment with synchronization signals SYNC such as horizontal and vertical synchronization signals. When it performs the outline font draw according to the directions from the processor 12, the first controller 16 reads in required outline font data by accessing the system memory 13 or directly from the processor 12. The first controller 16 then performs necessary operations, such as rotation, enlargement and reduction, on the outline defined by the outline font data thus read, and also calculates the coordinates of the outline.

The outline or profile coordinates represent the outline draw address of a required pattern that corresponds to the address on the frame buffer memory 15. The outline coordinates may be calculated in two steps, i.e., by first determining the logical coordinates and then calculating the outline coordinates corresponding to the outline draw address. Alternatively, the outline coordinates may be obtained by directly calculating the outline or profile coordinates that correspond to the outline draw address. When the first method is used, the dot font data, which is expressed in dot matrix form, be handled easily.

The first controller 16 asserts the request signal REQ1 to get the right to access the frame buffer memory 15, after which it draws the profile of a pattern on the frame buffer memory 15 by using the calculated outline coordinates as the draw address. The outline draw can be set to be initiated each time a group of outline or profile coordinates are calculated or when an entire closed outline is defined by the outline coordinates. While it is calculating the outline coordinates, the first controller 16 negates its request signal REQ1 to give up the right to access the frame buffer memory 15. When it has completed drawing the profile on the frame buffer memory 15, the first controller 16 requests, through a local bus 18, the second controller 17 to paint out the internal area of the profile.

The second controller 17 may be a controller dedicated to painting the internal area in the profile which was drawn by the first controller 16. Information, such as a command to paint the internal area of the outline drawn by the first controller, an instruction to start the paint operation, or a starting coordinates for the paint operation, is given by the first controller 16 to the second controller 17 through a local bus 18.

Upon receiving the instruction for paint operation through the local bus 18, the second controller 17 asserts the request signal REQ2 to obtain the right to access the frame buffer memory 15. It then starts painting or filling the internal area of the outline from the paint starting point coordinates. The paint operation may be carried out as follows. The second controller 17 reads data successively from the frame buffer memory 15 in the horizontal direction to determine the bit position that forms a part of the profile, and then rewrites all the horizontal bits located between that profile bit position and the start point coordinates. This processing is done both to the left and to the right of the paint starting point coordinates. After the above horizontal processing is finished, the second controller 17 moves the paint starting point coordinates one bit vertically within the profile. At this bit position it also performs the horizontal paint. In this way, as the paint starting point coordinates are moved one bit at a time from the vertically uppermost position to the lowermost position inside the outline, the horizontal paint operation is repeated until the entire inner area of the outline is painted out.

While the second controller 17 is performing the paint operation, the first controller 16 can calculate the outline coordinates according to the according to the outline font data that is to be processed next. In this way, parallel operation is possible. That is, the first controller 16 calculates the coordinates of the pattern outline to be processed next at the same time that the second controller 17 is doing the paint operation. This enhances the efficiency of pattern drawing utilizing the outline font data.

FIG. 3 shows a block diagram showing one example of the first controller 16. In this example, each block enclosed by two-dot line is formed on a single semiconductor substrate by a known semiconductor integrated circuit manufacture technology. In other words, the circuits are formed in a single chip. Likewise, in the second controller 17, which will be detailed later by referring to FIG. 4, each of the blocks enclosed by two-dot line is formed on one semiconductor substrate to form a single chip IC. The first and second controllers shown in FIG. 7 and 9 may both be formed on a single chip.

The first controller 16 may include a drawing processor 28 to generate draw addresses and draw data, a display processor 29 to generate display addresses and various display timing signals, and a refresh address generating circuit 30 to generate refresh addresses for the frame buffer memory 15. These functional blocks 28, 29, 30 are connected to the system bus 14 through a system bus interface 21 and are given various commands and control information by the processor 12. The drawing processor 28, the display processor 29 and the refresh address generating circuit 30 access the frame buffer memory 15 through the frame buffer bus interface 22.

The drawing processor 28 in this example includes a sequence control circuit 25, an execution unit 26 and a memory 27, and is connected to a local bus 18 through a local bus interface 20.

The sequence control circuit 25 decodes a variety of draw commands given by the processor 12 and generates, according to a predetermined sequence, control signals for pattern drawing. The sequence control circuit 25 also transfers the request signal REQ1 and the acknowledge signal ACK1 between it and the arbiter 19. The sequence control circuit 25 also sends the paint instruction and the paint starting point coordinates information to the second controller 17. For example, when the processor 12 sends an outline font draw command to the first controller 16, the command includes information on the character or symbol to be outline font-drawn. This information is decoded by the sequence control circuit 25 and is used for accessing the corresponding outline font data. The execution unit 26 performs arithmetic operations to calculate the draw data, draw address, and other memory access addresses. In the outline font drawing, the execution unit 26 calculates the coordinates of the required pattern profile according to the outline font data by performing floating point multiplication and addition. This arithmetic operation is controlled by the sequence control circuit 25 according to the code information contained in the outline font data. The memory 27 is a working area used for the calculation of profile coordinates.

FIG. 4 shows one example of the second controller 17.

The second controller 17 in this example includes a sequence control circuit 32, an execution unit 33, and a memory 34, and transfers information to and from the arbiter 19 through a frame buffer bus interface 35. Through the frame buffer bus interface 35, it also accesses the frame buffer memory 15. The second controller 17 transfers information to and from the first controller 16 through a local bus interface 36. Through a system bus interface 37 it is connected to the system bus 14 so that the processor 12 can set the initial internal state of the second controller 17.

The sequence control circuit 32 decodes the paint command from the first controller 16 and, according to a predetermined sequence, generates a variety of control signals for the paint operation. It also transfers the request signal REQ2 and the acknowledge signal ACK2 between it and the arbiter 19. The memory 34 is used to store various patterns or corresponding pattern data for paint operations and is also used as a working area. The execution unit 33, according to the paint starting point coordinates given by the first controller 16 and to the control by the sequence control circuit 32, performs the paint operation by using the paint draw data and draw addresses and by calculating the access address for the memory 34.

Next, one example of the outline font drawing operation will be explained.

FIGS. 5A to 5F show one example of outline drawing and paint operations which are performed according to the outline font data that represent a character " "

When instructed by the processor 12 to perform the outline font drawing of the character " " the first controller 16 reads the outline font data corresponding to the character " " either through the processor 12 or directly from the system memory 13.

Figure 5A:
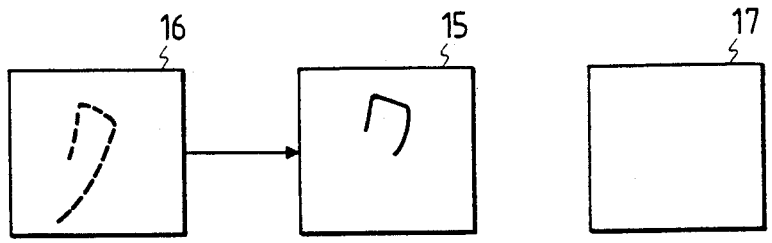
FIGS. 5A to 5F are explanatory drawings showing sequences of the pattern, drawing operation using the outline font data.

The first controller 16 performs necessary operations—such as rotation, magnification or reduction—on the outline which is defined by the outline font data read out. At the same time, it calculates the coordinates of the points on the profile and uses the calculated profile coordinates as the draw addresses to draw the profile of the pattern on the frame buffer memory 15. This operation is illustrated in FIG. 5A.

Figure 5B:
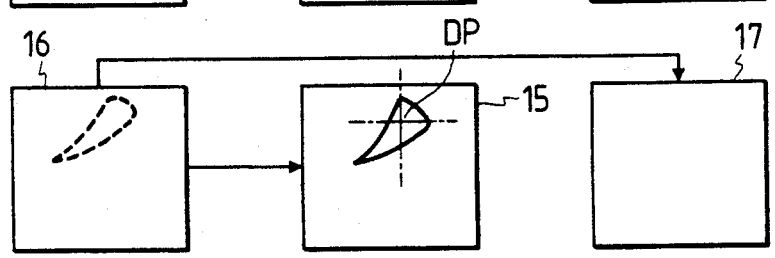

As shown in FIG. 5B, the first controller 16 draws the closed profile on the frame buffer memory 15 before instructing the second controller 17 to perform the paint operation on the internal area of the profile and giving it the paint starting point coordinates DP. The paint starting point coordinates are given as X and Y coordinates that correspond to the logical address. Where the pattern to be painted out can be selected, the first controller 16 may specify that pattern or the paint pattern may be preselected by the processor 12 by giving that initial setting to the second controller 17.

Figure 5C:
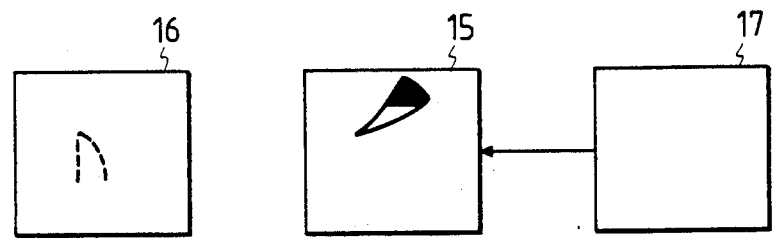

Upon being instructed by the first controller 16 to perform the paint operation, the second controller 17 asserts the request signal REQ2 to acquire the right to access the frame buffer memory 15 and then starts painting the interior of the profile from the paint starting point coordinates in, say, a read/modify/write mode. While the second controller 17 is performing the paint operation, the first controller 16 calculates the coordinates of the next profile to be processed, as shown in FIG. 5C.

Figure 5D:
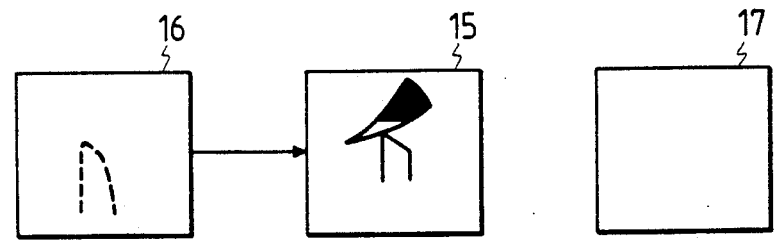

As it calculates the outline coordinates at the same time the second controller 17 is doing the paint operation, the first controller 16 obtains the right to access the frame buffer memory 15 at the specified timing and, as shown in FIG. 5D, draws a part of the next profile on the frame buffer memory 15 by using the outline coordinates calculated thus far as the draw addresses. While the profile is being drawn, the second controller 17, which shares the frame buffer memory 15 with the first controller 16, temporarily suspends the paint operation. The first controller 16 may be made to start drawing the profile only after the coordinates for all points on the closed profile have been calculated.

Figure 5E:
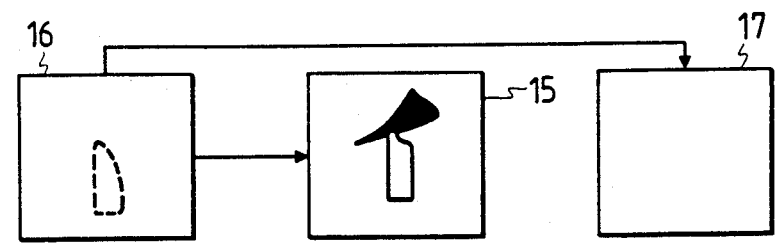
Figure 5F:
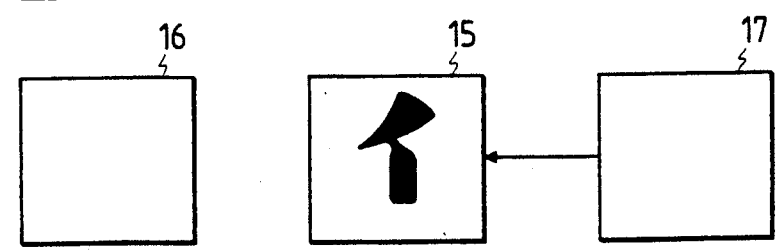

When the first controller 16 finishes drawing the second profile of the character " " as a result of the parallel operations—the simultaneous operations which consist of the first operation by the first controller 16 of calculating the coordinates of the next profile and drawing the profile at specified timings and the second operation by the second controller 17 of performing the paint operation on the previous profile—the first controller 16, as shown in FIG. 5E, instructs the second controller 17 to start painting the interior of the profile and also gives information such as the paint starting point coordinates to the second controller 17. After receiving the instruction, the second controller 17 paints the interior of the second profile as shown in FIG. 5F. In the mean time, the first controller 16 fetches from the system memory 13 another outline font data to be processed next and performs the same parallel operations as described above, calculating the coordinates of the points on the profile.

FIG. 6 is a timing chart showing the timing of the processing of FIG. 5A to 5F.

In FIG. 6, the first controller 16 fetches necessary outline font data from the system memory 13 at time $t_0$ and, at time $t_1$, starts calculating the coordinates of the points on the profile and drawing that profile. At time $t_2$ when it finishes drawing one closed profile on the frame buffer memory 15, the first controller 16 gives an instruction to the second controller 17 to paint the interior of that profile. When so instructed, the second controller 17 starts painting from time $t_3$ and finishes it at time $t_5$. While the second controller 17 is performing the paint, the first controller 16 starts calculating, from time $t_4$, the coordinates of the remaining profile and also draws the second profile at the same time the second controller 17 is painting the first profile. Since, in this embodiment, the first controller 16 is given a higher priority in accessing the frame buffer memory 15 than the second controller 17, the paint operation by the second controller 17 is temporarily suspended when the first controller 16 is drawing the outline.

At time $t_6$ when the calculation of profile coordinates and the profile drawing by the first controller 16 are finished, the first controller 16 gives an instruction to the second controller 17 to paint the interior of the profile. The second controller 17 then starts painting the interior of the profile from time $t_7$. While the second controller 17 is performing the painting, the first controller 16, at time $t_8$, starts fetching another outline font data from the system memory 13 and, at time $t_9$, starts calculating the coordinates of the profile according to the fetched outline font data and then drawing that profile. These operations by the first controller 16 proceed along with the paint operation, which was initiated at time $t_7$ by the second controller 17.

The above embodiment has the following advantages.

(1) Parallel operations are possible. That is, while the second controller 17 is painting the interior of a profile, the first controller 16 can calculate the coordinates of another profile to be processed next. This permits the outline drawing and the outline interior painting to be performed with virtually no interruption of the pattern drawing process, thus improving the efficiency of the pattern making that uses the outline font data.

(2) The first controller 16 has a function to directly read the outline font data and calculate the outline coordinates of a desired pattern to be drawn on the frame buffer memory 15. This eliminates the need for the processor 12, which controls the entire graphics system, to perform the calculation which consists of rotating, magnifying or reducing the profile defined by the outline font data and determining the logical coordinates of the processed profile in dot matrix form. Therefore, the burden on the processor 12 for the outline font drawing operation is reduced, which in turn increases the operation efficiency of the system as a whole.

(3) Since the first controller 16 has a function to give the second controller 17 the paint control information and the paint command after it has completed drawing the profile, the burden on the processor 12 is also reduced.

Figure 7:
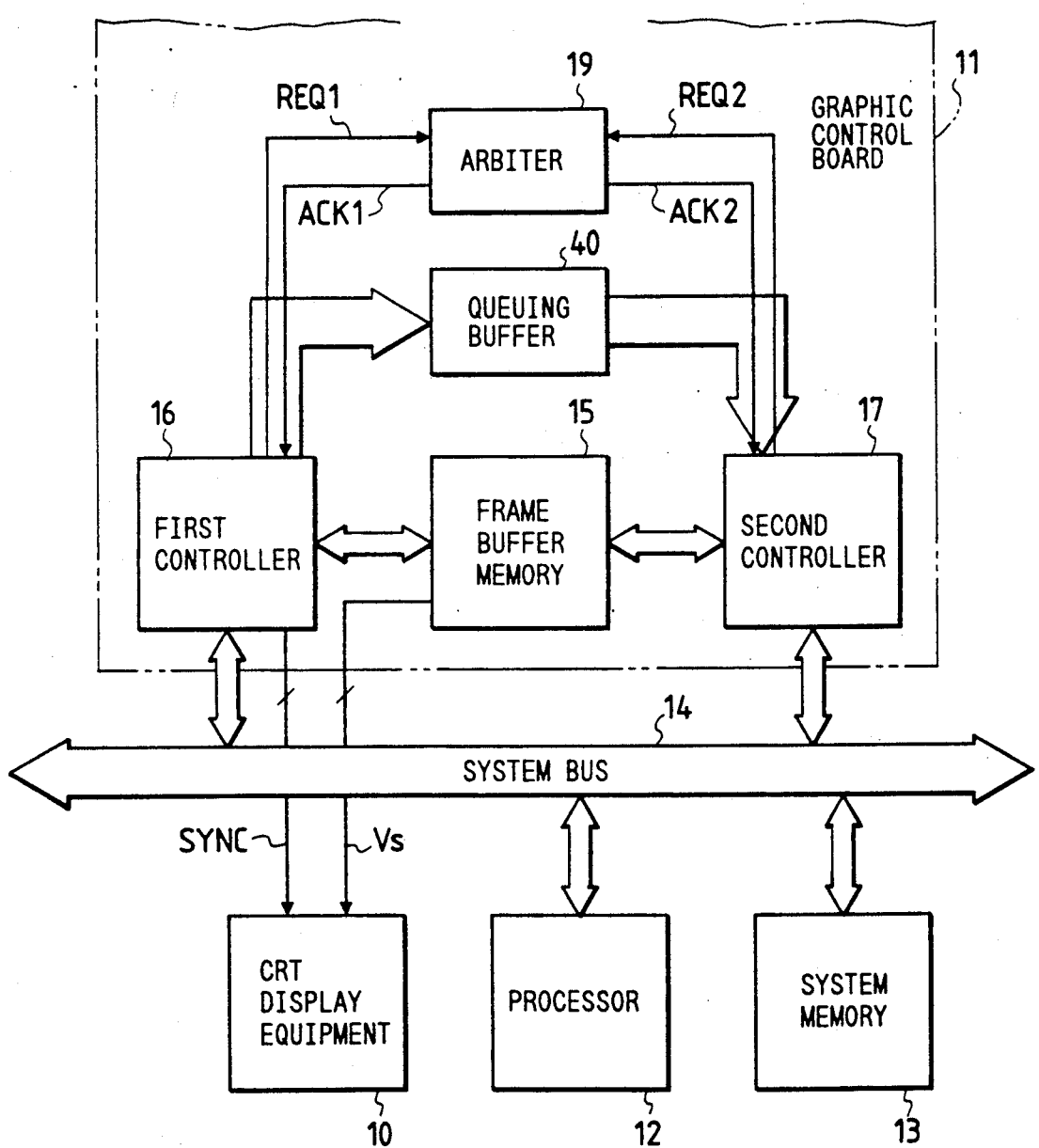
FIG. 7 is a block diagram showing another embodiment of the invention.

FIG. 7 shows the essential circuitry of another embodiment of the graphics system according to this invention.

The configuration shown in FIG. 7 differs from the graphics system of FIG. 1 in that a queuing buffer 40—which contains a first-in, first-out waiting queue of information about the paint instruction and the paint starting point to be given by the first controller 16 to the second controller 17—is added in place of the local bus 18. In this configuration, the second controller 17 accesses the queuing buffer 40 to get necessary information for the paint operation. In FIG. 7, the circuit blocks and signals are identical with those of FIG. 1 with like reference numerals and their detailed explanation will be omitted.

When the processing speed differs between the first controller 16 and the second controller 17, for instance, when the paint operation by the second controller 17 takes a longer time than the operation of the first controller 16, the queuing buffer 40 eliminates the need to stop the operation of the first controller 16 thus absorbing the difference in the processing speeds.

Figure 8:
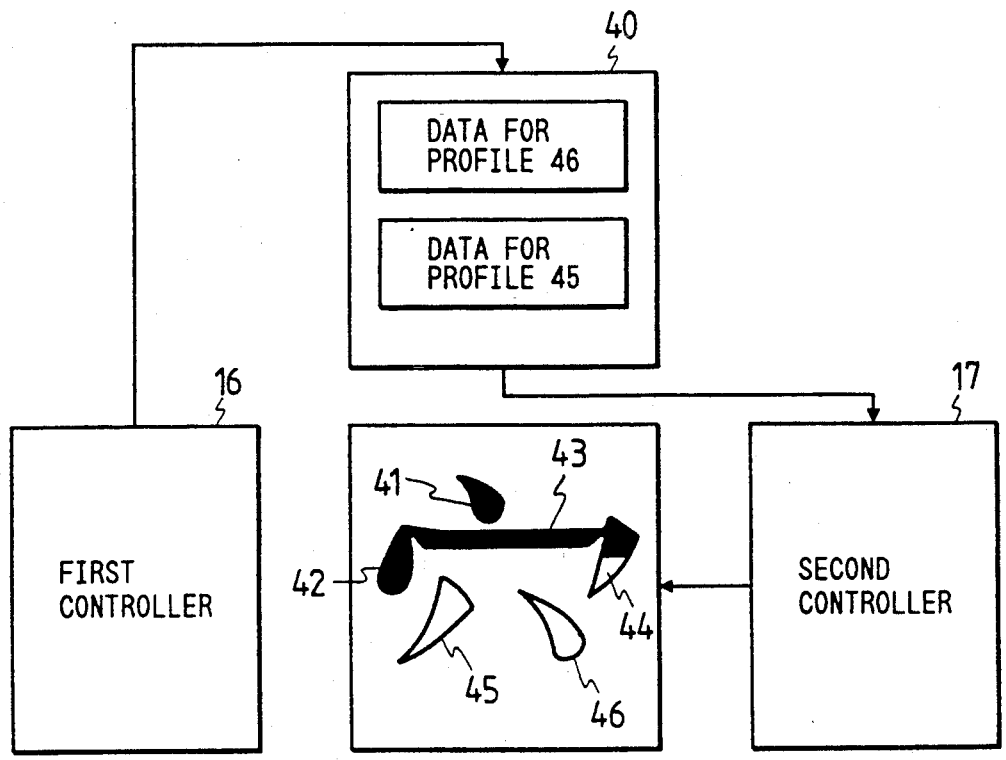
FIG. 8 is a diagram showing the operation of the queuing buffer as shown in FIG. 7.

For example, let us consider a case where a character "##" as shown in FIG. 8 is to be outline-font-drawn. Suppose the first controller 16 has finished drawing the profiles 41 to 44 and the second controller 17 is painting the interior of the profile 44. The first controller 16 now calculates the coordinates of the profile 45 and draws that profile at the same time the second controller 17 is painting the interior of the previous profile 44. If the painting of the interior of the profile 44 by the second controller 17 has not finished by the time the first controller 16 finishes drawing the profile 45, the first controller 16 proceeds to calculate the coordinates of the next profile 46 and draws that profile 46 after giving the information on the profile 45, such as the paint instruction and the paint starting point coordinates, to the queuing buffer 40. This operation by the first controller 16 is done while the second controller 17 is performing the paint operation on the profile 44. Further, if the painting of the profile 44 by the second controller 17 is not completed when the first controller 16 has finished drawing the profile 46, the first controller 16 puts the information about the profile 46, such as the paint instruction and the paint starting point coordinates, in the queuing buffer 40 and proceeds to the next processing. When the second controller 17 finishes painting the interior of the profile 44, it accesses the queuing buffer 40 to get the information about the profile 45, such as the paint instruction and the paint starting point coordinates, and executes painting the interior of the profile 45.

The provision of the queuing buffer 40 allows the first controller 16 to continue its operation without halting while the second controller 17 is painting the large internal area of a profile that will take the second controller 17 a protracted time to complete. Thus, the controller 16 can proceed to calculate the coordinates of the points on the next profile and draw that profile without having to wait until the completion of the painting operation by the second controller 17. The efficiency of the outline font drawing, therefore, is further improved.

Figure 9:
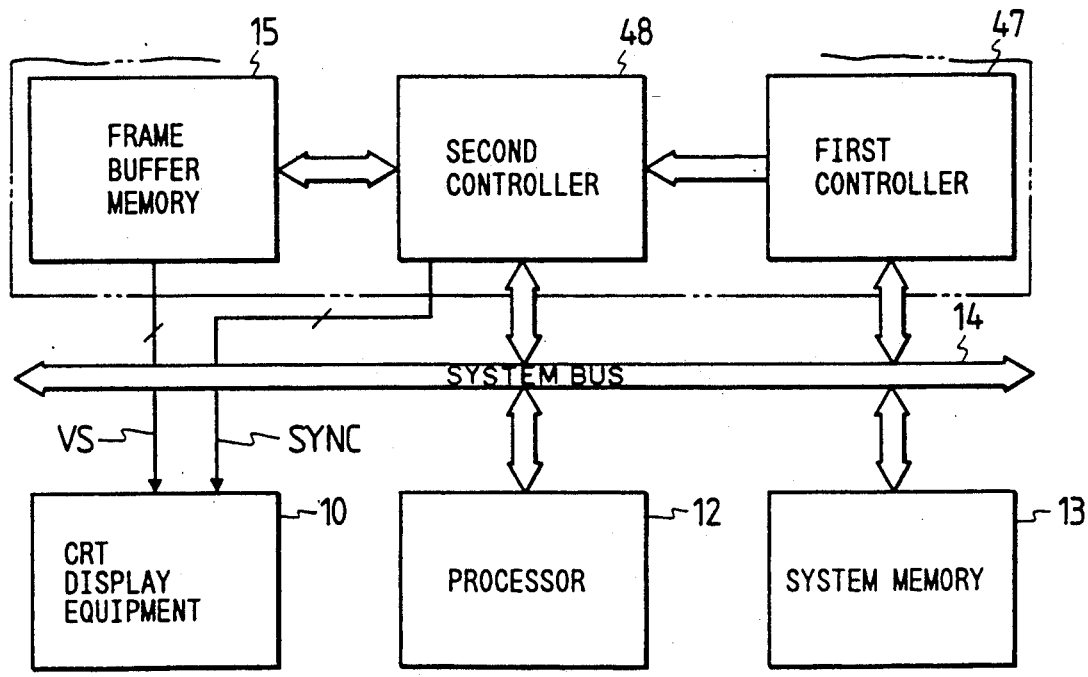
FIG. 9 is a block diagram showing still another embodiment of the invention.

FIG. 9 shows the essential circuitry of the graphics system of still another embodiment according to this invention.

A first controller 47 shown in FIG. 9, when it receives an instruction for the outline font drawing from the processor 12, reads the desired outline font data either by accessing the system memory 13 or through the processor 12. It then performs necessary processing, such as rotation, enlargement or reduction, on the profile that is defined by the outline font data and also calculates the coordinates of the points on the profile. The calculated profile coordinates need not be the coordinates that directly correspond to the addresses on the frame buffer memory 15 and may instead be logical coordinates of the points on the profile. They need only be the profile coordinates expressed in dot matrix form. After calculating the profile coordinates, the first controller 47 gives the profile coordinates to the second controller 48 without drawing the profile.

The second controller 48 performs a draw control to generate draw data and draw addresses to store image information on the frame buffer memory 15. At the same time it also performs a display address control and various display timing controls to output the image information on the frame buffer memory 15 to the CRT display equipment 10 in synchronism with scan signals. Upon receiving the profile coordinates from the first controller 47 the second controller 48 draws the profile and paints the interior of that profile.

While the second controller 48 is drawing the profile and painting its inner area, the first controller 47 calculates the profile coordinates of a pattern to be processed next.

The circuit blocks and signals that are identical with those of FIG. 1 are given like reference numerals, and their explanations will be omitted.

Like the preceding embodiment, the system of this embodiment too is capable of parallel operations—the simultaneous operations which consist of the first operation by the first controller 47 of calculating the profile coordinates of the next pattern and the second operation by the second controller 48 of performing the drawing and painting of the previous profile. This reduces the burden on the processor 12 thus improving the efficiency of the pattern drawing system that uses the outline font data. Compared to the preceding embodiment, however, this example requires, in addition to the outline drawing and the painting, another step to transfer the profile coordinates calculated by the first controller 47 to the second controller 48.

In the foregoing, the invention has been described in connection with the preferred embodiments. It should be noted, however, that the invention is not limited to the aforementioned examples alone and that a variety of modifications may be made without departing from the spirit and scope of this invention.

For example, while in the embodiments shown in FIGS. 1 and 7 the first controller 16 performs the display control, it is possible to have the second controller 17 do the same control.

The output of the video signals is not limited to the direct output from the frame buffer memory which has dual ports, and it is also possible to have the controller, which supports the display control, read the image information to be displayed from the frame buffer memory and serially output it. In the embodiments of FIGS. 1 and 7, the random access port of the frame buffer memory 15 may be duplicated to provide one port for the first controller 16 and one for the second controller 17. In that case, an arbiter is required to prevent simultaneous writing of the same address on the frame buffer memory 15 by the first controller 16 and the second controller 17.

It is possible to form the first controller 16, the second controller 17, and the arbiter 19 on a single semiconductor substrate such as a silicon substrate to provide these circuits as a single LSI. The same also applies to the embodiments of FIGS. 7 and 9.

While the foregoing description centers on the invention as applied to the graphics system including the CRT display equipment—the field from which the invention has originated—the invention may also find a wide range of applications. For example, the invention may be applied to systems which perform the outline font drawing by using bit map displays such as plasma displays and liquid crystal displays and also by using page printers such as laser beam printers, liquid crystal printers and LED printers. This invention can be applied to at least the system where the outline font drawing is performed.

I claim:

1. A pattern drawing system comprising;
   a memory to store a large amount of outline font data;
   a processor to instruct a pattern drawing operation based on the outline font data;
   a first data processing means to read, in response to an instruction from the processor, the outline font data for a desired pattern, develop the outline font data thus read in, calculate first profile coordinates of the pattern and, according to the calculated first profile coordinates, draw a first profile of the desired pattern on a bit map memory;
   a second data processing means to paint an interior of the first profile drawn by the first data processing means concurrently with the calculation by the first data processing means of second profile coordinates; and,
   an arbiter means to give a priority to the first data processing means over the second data processing means in accessing the bit map memory when the first data processing means and the second data processing means contend for a right to access the bit map memory.

2. The pattern drawing system as set forth in claim 1 wherein the first data processing means includes means for performing a step of giving the second data processing means an instruction to paint the interior of the first profile and control information each time the first data processing means has finished drawing one closed profile.

3. A method for drawing a pattern on a frame buffer memory useful in a system including a first data processor and a second data processor, the method comprising the steps of:
   the first data processor calculating first pattern outline coordinates;
   the first data processor drawing a first pattern outline on the frame buffer memory in accordance with the first pattern outline coordinates;
   the second data processor painting an interior area of the first pattern outline;
   the first data processor calculating second pattern outline coordinates concurrently with the painting of the interior area of the first pattern outline by the second data processor;
   suspending the painting by the second data processor; and,
   the first data processor drawing a second pattern outline on the frame buffer memory in accordance with the second pattern outline coordinates.

4. A method for drawing a pattern on a frame buffer memory useful in a system including a first data processor and a second data processor, the method comprising steps of:
   the first data processor calculating first pattern outline coordinates;
   the first data processor drawing a first pattern outline on the frame buffer memory in accordance with the first pattern outline coordinates;
   the second data processor painting an interior area of the first pattern outline;
   the first data processor calculating second pattern outline coordinates concurrently with the painting of the interior area of the first pattern outline by the second data processor; and,
   wherein the calculating of the first pattern outline coordinates and the drawing of the first pattern outline occur simultaneously by drawing of the first pattern outline coordinates calculated thus far before completion of the calculating of a closed first pattern outline.

* * * * *